(12) United States Patent  (10) Patent No.: US 6,196,092 B1
Potter  (45) Date of Patent: *Mar. 6, 2001

(54) TOOL FOR CARGO STRAP BUCKLE RATCHET WINCH

(75) Inventor: Lawrence L. Potter, Prophetstown, IL (US)

(73) Assignee: Quick Winch Products Inc., Tampico, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/955,175

(22) Filed: Oct. 21, 1997

(51) Int. Cl.[7] .................................................... B25B 33/00
(52) U.S. Cl. ............................... 81/488; 254/131; 81/484
(58) Field of Search .............................. 81/484, 486, 488; 410/96, 100, 156; 254/120, 131

(56) References Cited

U.S. PATENT DOCUMENTS

| | | |
|---|---|---|
| 3,290,769 | * 12/1966 | Kashergen ........................ 254/131 X |
| 3,657,944 | 4/1972 | Able . |
| 4,510,651 | 4/1985 | Prete, Jr. et al. . |
| 4,564,991 | * 1/1986 | Taylor ................................ 81/488 X |
| 4,802,391 | * 2/1989 | Willjhoite et al. ..................... 81/488 |
| 4,930,337 | * 6/1990 | Schaap ................................ 81/484 X |
| 5,425,154 | 6/1995 | Edwards, Jr. . |
| 5,429,463 | 7/1995 | Howell . |
| 5,433,565 | 7/1995 | Chan . |
| 5,524,505 | 6/1996 | Lawrence . |
| 5,549,429 | 8/1996 | Sergent . |

* cited by examiner

*Primary Examiner*—James G. Smith
(74) *Attorney, Agent, or Firm*—Wood, Phillips, VanSanten, Clark & Mortimer

(57) ABSTRACT

A tool for manipulating the reciprocable lever of a cargo strap buckle ratchet winch has an elongate shank, a C-configuration transverse handle at one end of the shank and a fulcrum plate at the other end for engagement with the strap winch lever. The plate has a planar proximal section attached to the shank and parallel with the transverse handle, and a planar distal section remote from the shank and extending at an obtuse handle with respect to the proximal section. A foot portion of the fulcrum plate extends at a right angle to the distal section, to engage a fulcrum surface.

5 Claims, 2 Drawing Sheets

TOOL FOR CARGO STRAP BUCKLE RATCHET WINCH

Not applicable.

STATEMENT REGARDING FEDERALLY SPONSORED RESEARCH OR DEVELOPMENT

Not applicable.

BACKGROUND OF THE INVENTION

Straps are commonly used to secure cargo on a vehicle, as a truck, ship or airplane. Often two straps or the two ends of one strap are connected with a buckle ratchet winch. The winch has a lever actuator for winding one end of the strap on a reel to tighten the strap (or straps) about the cargo. The configuration of the cargo and of the cargo space of the vehicle sometimes require that the winch be in a location where it is inconvenient to actuate the lever by hand. Prete et al. U.S. Pat. No. 4,510,651 and Sergent U.S. Pat. No. 5,549,429 disclose lever extension tools for such a strap winch. The tools of both patents have straight bar shanks and handles which are difficult, if not impossible, to use in some situations.

BRIEF SUMMARY OF THE INVENTION

The invention provides a tool for a cargo strap buckle ratchet winch which has a configuration that facilitates manipulation of the winch lever in situations where the winch is inconveniently located.

More particularly, one feature of the invention is that the tool has an elongate shank, a transverse handle at one end of the shank, and means at the other end of the shank for engagement with the strap winch lever. More particularly, the handle has a C-configuration with a first section extending at a right angle to the shank, a second section extending at a right angle to the first section and parallel to the shank, and a grip section extending at a right angle to the second section, transverse to the shank and parallel with the first section.

Another feature of the tool is that the means for engagement with the strap winch lever is a fulcrum plate secured to the shank. The fulcrum plate has a transverse extent parallel with the transverse handle. More particularly, the fulcrum plate has a planar proximal section attached to the shank and a planar distal section remote from the shank and extending at an obtuse angle with respect to the proximal section. A foot portion of the fulcrum plate extends at a right angle to the distal plate section.

Further features and advantages of the invention will be apparent from the following specification and the drawings.

BRIEF DESCRIPTION OF THE SEVERAL VIEW OF THE DRAWINGS

DETAILED DESCRIPTION OF THE INVENTION

Cargo straps are typically of a polyester webbing, 1 inch to 4 inch in width and may have a breaking strength from 2,000 to 20,000 lbs. Similarly, strap bucket ratchet winches are of different sizes and load capacities. The tool described herein is useable with winches of different sizes.

Figure 1:
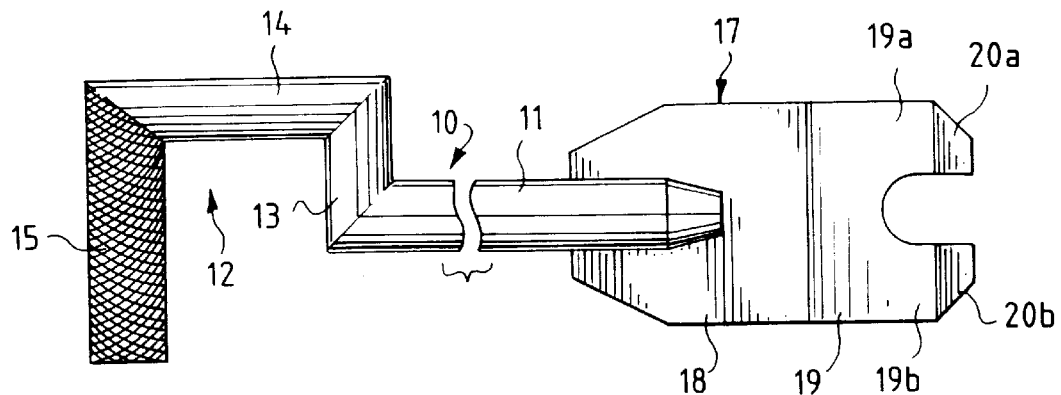
FIG. 1 is a broken plan view of the tool.
Figure 2:
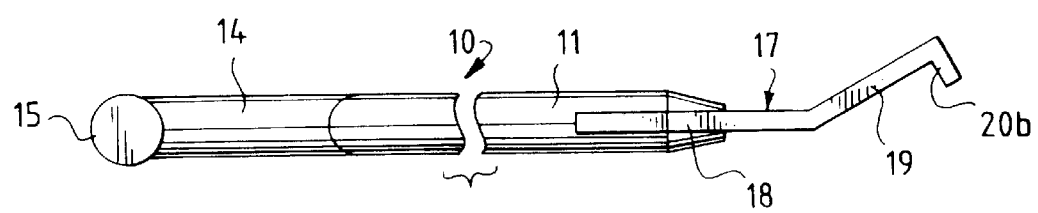
FIG. 2 is a broken side view of the tool.

The tool 10, FIGS. 1 and 2, has an elongate shank 11, as a steel rod ½ inch or ¾ inch in diameter and preferably 1½ to 2 feet long. One end of the tool has a C-configuration handle 12 with a first section 13 extending at a right angle to shank 11, a second section 14 extending at a right angle to the first section and parallel to an extension of the shank 11. A grip section 15 extends at a right angle to second section 14, parallel with the first section 13, transverse to and intersected by an extension of shank 11. Grip section 15 is roughly twice the length of first section 13 and provides the principal means for manipulating the tool. The surface of grip section 15 is preferably knurled to enhance control of the tool.

A fulcrum plate 17 is fixed at the other end of shank 11. The plate has a planar proximal section 18, in the plane of the shank, and a planar distal section 19 which extends at an obtuse angle with respect to the proximal section. The end of the distal section is bifurcated with two legs 19a, 19b. Foot portions 20a, 20b at the ends of legs 19a, 19b extend at a right angle to the plane of distal section 19.

Figure 3:
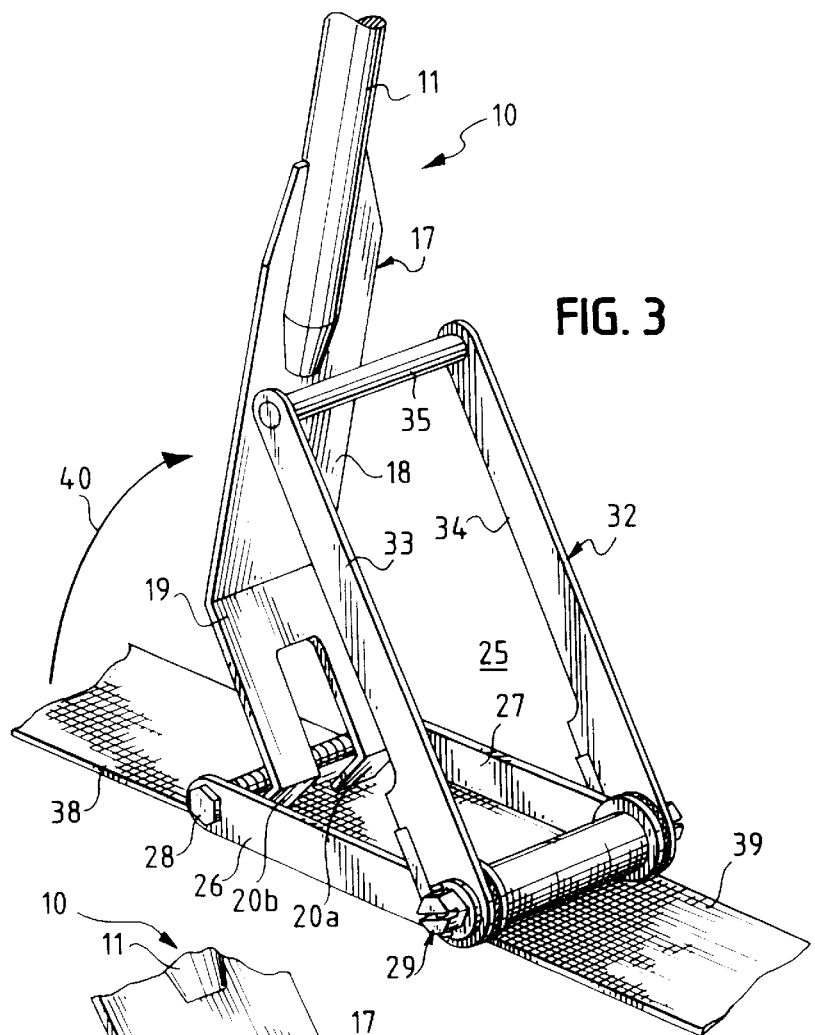
FIG. 3 is a fragmentary perspective of a strap, buckle winch and tool showing one manner of operation of the winch lever.

A typical strap buckle winch 25, FIG. 3, has a frame with two side plates 26, 27 joined at one end by cross bar 28 and at the other end by a reel and ratchet mechanism 29. Lever 32 has side plates 33, 34 joined at one end with the reel and ratchet mechanism 29 and at the other end by cross bar 25. Details of the reel and ratchet mechanism, not illustrated in the drawing, are well known and may be found, for example, in Prete et al. U.S. Pat. No. 4,185,360, Prete et al. U.S. Pat. No. 4,510,651 and Sergent U.S. Pat. No. 5,549,429.

An end of a cargo strap 38 is secured to frame cross member 28 and another end of cargo strap 39 is connected with reel and winch mechanism 29. Strap ends 38, 39 may be two ends of a single strap which encircles cargo or may be ends of separate lengths of strap that are anchored to the vehicle or to the cargo being secured (not shown). Reciprocation of lever 32, arrow 40, winds strap 39 on the reel, tightening the straps as desired to secure the cargo.

Manual reciprocation of lever 32 is often difficult because of cramped quarters resulting from the vehicle and cargo configuration; and the lever may be slippery from rain or snow. Tool 10 is particularly useful in such situations.

The tool is used to manipulate winch lever 32 by engaging the feet 20a, 20b of fulcrum plate 17 with winch frame crossbar 28 and the lifting tool to the position shown in FIG. 3. Crossbar 35 of lever 32 slides along fulcrum plate 17 and, depending on the relative dimensions of the winch and tool, along shank 11. Tool 10 and lever 32 are lowered and the action repeated until strap 39 is sufficiently tightened. The obtuse angle between sections 18, 19 of fulcrum plate 17 positions handle 12 away from strap 38 when the winch lever 32 is fully lowered. The transverse extent of the fulcrum plate minimizes any tendency of the tool to twist as the lever is lifted. The length of the shank 11 of the tool adds to the mechanical advantage of winch lever 32. The C-configuration handle 12 allows the user to have a secure grip on the tool in awkward situations where the straight shank could not easily be held.

Figure 4:
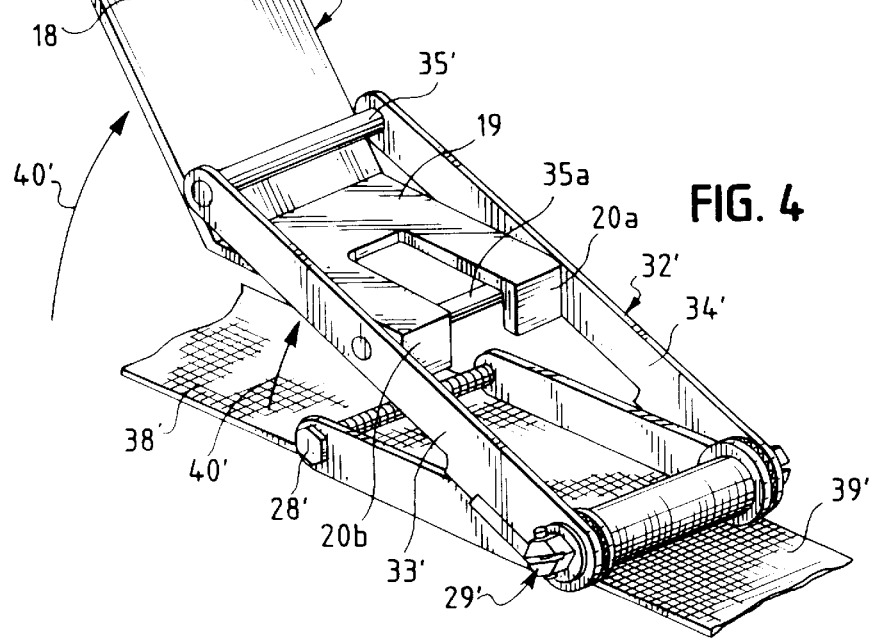
FIG. 4 is a fragmentary perspective similar to FIG. 3 showing another manner of operation of the winch lever.

Use of tool 10 with a different embodiment of winch is illustrated in FIG. 4. Elements of FIG. 4 corresponding to elements of FIG. 3 are identified by the same reference numerals with a prime notation and will not all be described in detail. The winch of FIG. 4 differs from that of FIG. 3 primarily in that lever 32' and side plates 33', 34' are longer and the lever has a second crossbar 35a at an intermediate point between crossbar 35' and reel and ratchet mechanism 29'. Such a winch is commonly used with a wider, heavier strap to apply higher levels of holding force.

In this situation, tool 10 is used by engaging foot portions 20a, 20b of fulcrum plate 17 with the intermediate crossbar 35a of lever 32'. Lifting the tool causes the proximal section 18 of fulcrum plate 17 to engage the undersurface of crossbar 35', in turn lifting lever 32' to manipulate the reel and ratchet mechanism 29', winding strap 39' on the reel.

I claim:

1. A tool for manipulating the reciprocable lever of a cargo strap buckle ratchet winch, the winch having a winch frame with two side plates joined by a frame crossbar, the reciprocable lever having two side plates pivoted at one end to the winch frame and joined by a lever crossbar spaced from the pivot, the tool comprising:

an elongate shank;

a handle at one end of the shank and extending from the shank; and a fulcrum plate having an extent transverse with respect to the shank and parallel with the handle, with a planar proximal section secured to the other end of the shank adapted to engage the lever crossbar, a planar distal section remote from the shank and extending at an obtuse angle with respect to the proximal section, and a foot portion at the end of the distal section remote from the obtuse angle and extending at a right angle to the distal section in a direction opposite that of the proximal section, the foot portion and distal section engaging the winch as a fulcrum and the proximal section engaging the lever crossbar to reciprocate the winch lever and operate the winch by reciprocation of the handle.

2. The strap winch of claim 1 in which said planar distal section has two transversely spaced leg portions and said foot portion comprises first and second foot portions, one at the remote end of each leg portion, for engagement to the winch frame crossbar.

3. The strap winch of claim 1 wherein the handle and the shank define a plane and said handle is a C-configuration handle having a first section extending at a right angle to the shank, a second section extending at a right angle to said first section parallel to said shank and away from said fulcrum plate, and a grip section extending at a right angle to the second section, transverse to the shank and parallel with the first section, the handle sections all lying in the defined plane.

4. The strap winch tool of claim 1 wherein the winch frame lies in a winch plane and the obtuse angle of the fulcrum plate positions the handle away from the winch plane when the foot portion and distal section of the tool engages the winch.

5. The strap winch tool of claim 1 wherein the handle and shank define a plane, and a juncture of the foot portion and the distal section is parallel to the defined plane.

* * * * *